United States Patent [19]

Norris

[11] Patent Number: 4,539,708
[45] Date of Patent: Sep. 3, 1985

[54] EAR RADIO

[75] Inventor: Elwood G. Norris, Salt Lake City, Utah

[73] Assignee: American Technology Corporation, Salt Lake City, Utah

[21] Appl. No.: 511,360

[22] Filed: Jul. 1, 1983

[51] Int. Cl.³ .......................... H04B 7/00; H04B 1/08
[52] U.S. Cl. ..................................... 455/49; 455/100; 455/232; 455/351
[58] Field of Search .................. 455/351, 100, 41, 232, 455/49, 39, 89, 95, 200; 179/107 E, 182 R, 108 A, 156 R

[56] References Cited

U.S. PATENT DOCUMENTS

| | | | |
|---|---|---|---|
| 2,805,332 | 9/1957 | Bell | 455/351 |
| 3,234,467 | 2/1966 | Haveson | 455/351 |
| 3,590,382 | 6/1971 | Kenney | 455/20 |
| 3,821,647 | 6/1974 | Minasian | 455/351 |
| 4,004,299 | 1/1977 | File | 455/351 |
| 4,087,793 | 5/1978 | Lucas | 455/200 |
| 4,412,106 | 10/1983 | Pavel | 455/100 |

FOREIGN PATENT DOCUMENTS 1337289  8/1963  France ................................ 455/351

OTHER PUBLICATIONS

"Fingertip Volume Control"—Meschenmoser, Jul.-Aug. 1975—Elektor, vol. 1, No. 5, p. 750.

Primary Examiner—Marc E. Bookbinder

[57] ABSTRACT

A self-contained, fully operational radio device adapted in size and configuration for implacement and retention at the entrance to an ear canal, said device being fully self-supported by surrounding ear cartilage, thereby eliminating any need for connecting wires or other radio circuitry. The device includes a casement having an outward and an inward housing for containing the respective radio circuitry and speaker means for the radio device. A battery is also contained within the outward housing for powering the radio system. The maximum outside dimensions of the radio device and enclosed radio circuitry are less than ¾ of an inch in diameter and one inch in length. Various functional controls are provided for convenient operation of on/-off, frequency selection, and volume level.

15 Claims, 5 Drawing Figures

EAR RADIO

FIELD OF INVENTION AND PRIOR ART

Although radio technology has experienced significant innovation extending from new types of circuitry to novelty encasements such as watches, pens and eyeglasses, all radios—both old and new—have shared a common feature which has been unchanged for decades. This feature is found in all radios which are designed exclusively for single-user listening, where the user places a speaker means in his ear for private reception of the radio program. This separate class of radios is distinguished from other types of radios because of particular requirements of portability, small size and reasonable cost, as well as absence of a speaker.

In the past, such single-user radios have been characterized by the use of an ear plug speaker or set of earphones which isolate speaker operation separate from the radio at the ear of the user. This speaker is coupled to the audio output of the radio by means of a connector wire which must be sufficiently long to permit attachment of the radio to the user at his belt, pocket or the like. This connector wire is therefore essential because it is the only means for carrying the radio signal to the speaker plug or headset worn at the ear. Despite the many variations and improvements which have been developed over many years of radio history, this three-part system of (i) radio, (ii) headset and (iii) connector wire have been the sole method of single-user radio design.

The absence of alternative single-user radio systems which do not rely on a connector wire appears curious. Numerous disadvantages exist with this conventional three-part system which should have provided an incentive for improvement. Dominant among these problems has been the frequent entanglement of the connector wire with the user's body and with items worn or attached, such as pens, buttons, clothing, etc. The frustration of such entanglement is further exaggerated by the fact that the user is typically active when operating a single-user radio. As a consequence, the swinging motion occurring during jogging, skiing, bicycle riding, etc. turns the connector wire into a menacing obstacle which detracts from the pleasure of the activity.

The fact that this frustration has long been endured is strong evidence that there appeared to be no reasonable alternative arrangement which could provide the convenience of private radio use in active recreation. In fact, the process of elimination suggests that the three elements of radio, speaker and connector wire were already reduced to their lowest structural necessity, since each was integral to the restricted production of sound within a conventional radio system. To eliminate any one element of the three-part system would be to destroy the operation of the radio.

The human body provided the remaining limitation which reinforced the necessity of the three-part system. Specifically, with the speaker at the ear, the radio had to be supported at the belt or pocket, thus requiring a connector wire to make the system functional. Here again, each part of the radio system and human body was fulfilling what appeared to be an integral and essential function, removal of any one of which would disable radio operation during recreational activity.

Therefore, in view of an absence of apparent alternatives, the public has been willing to accept the inconvenience of the aforementioned single-user radio for decades. Such acquiescence does not, however, diminish the need for improvement, nor does it obviate innovation which steps across traditional perception and assumptions to provide a solution to this longstanding problem.

OBJECTS AND SUMMARY OF THE INVENTION

It is a primary object of the present invention to provide a self-contained, fully operational radio device adapted for implacement and retention in the user's ear.

It is a further object of the present invention to provide a fully operational radio device which requires no additional support beyond that provided at the opening of the ear canal.

It is a still further object of the present invention to provide a small-sized radio device which can be implaced and retained at the ear canal of the user, and which requires no connector wire or external means of attachment to other devices for reception of radio signal and sound production.

An additional object of the present invention is to provide a pair of small radio devices capable of implacement and retention at the respective ears of the user, wherein the pair of radios are capable of being tuned to separate frequencies, or subcarriers, comprising a stereo transmission.

Another object of the present invention is to provide a radio device which includes touch-activated circuitry for controlling volume, frequency selection and/or power supply to the radio circuitry.

These and other objects of the present invention are embodied in a self-contained, fully operational radio device which has a size and configuration adapting the radio for implacement and retention at the entrance to a user's ear canal. The radio device is retained at the ear canal and supported by surrounding ear cartilage which positions the radio device directionally toward the user's ear canal for sound transmissions.

The radio comprises a casement having outward and inward compartments as viewed in relation to casement position at the ear canal. Radio circuitry is contained within the outward housing and includes signal receiving means, and amplifying and filtering circuitry. The outward housing also contains a small battery or comparable power supply.

The inward housing of the casement contains a speaker which is coupled directly to the amplification circuitry in the outward housing. This speaker is directionally oriented toward the ear canal for proper sound transmission. The radio device is fully self-contained within the casement, which has maximum outside width dimensions smaller than the greatest distance across the ear cartilage support, but no greater than ¾ of an inch. The maximum length for the radio device from inward to outward housing is less than one inch.

BRIEF DESCRIPTION OF THE DRAWINGS

Other objects and benefits of the present invention will be apparent to those skilled in the art, in view of the drawings and detailed description which follows, wherein.

DETAILED DESCRIPTION OF THE INVENTION

Figure 1:
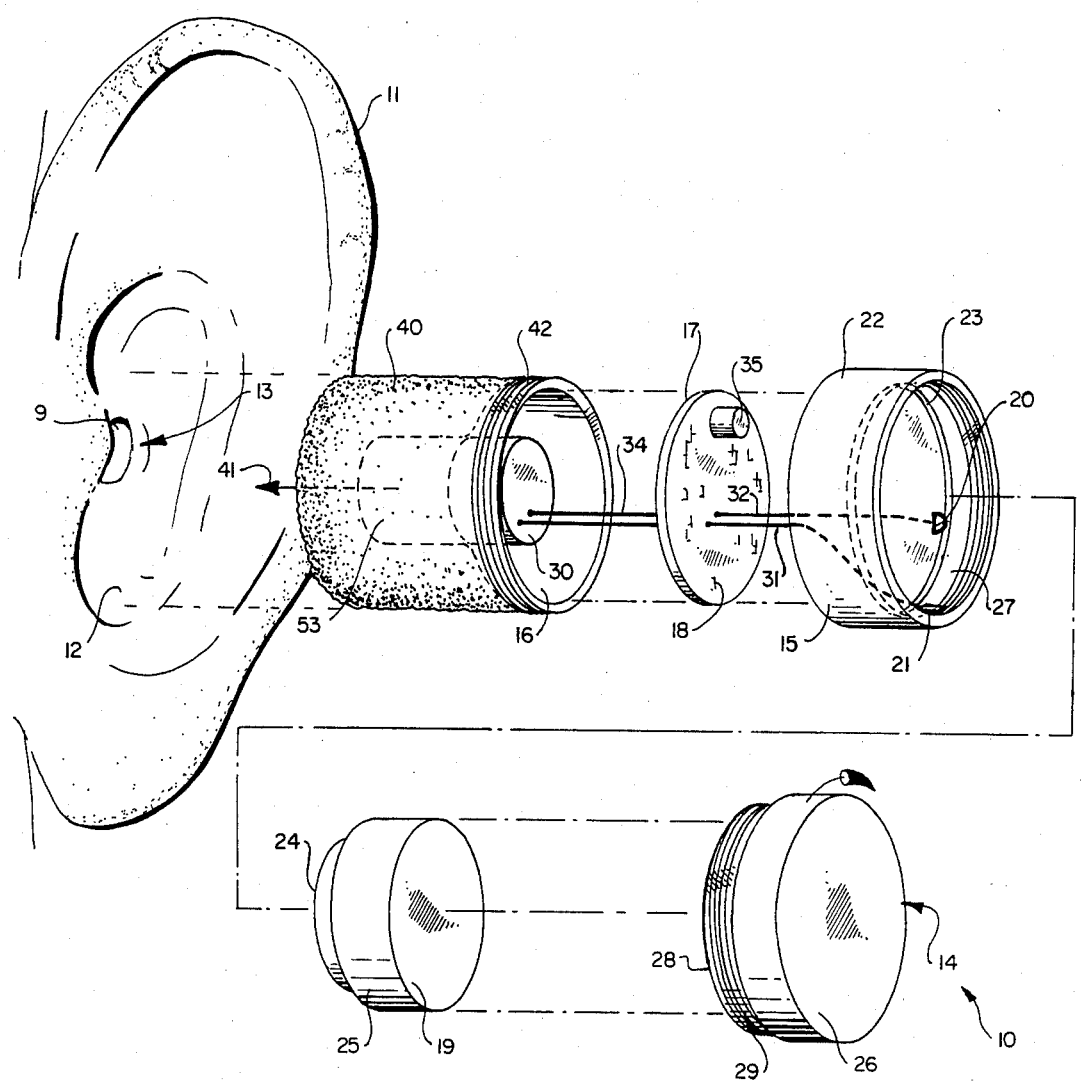
FIG. 1 shows an exploded view of the radio device with its positioning orientation with respect to a listener's ear.

Referring now to the drawings:

FIG. 1 shows a radio device 10 constructed in accordance with the teachings of the present invention. The subject radio device 10 is a self-contained, fully operational radio which is worn at the ear 11 and requires no additional support means, power supply or connecting wires. The size and geometric configuration of the radio device 10 are structured such that the device fits snugly within the ear cavity formed by surrounding cartilage 12 which shall be referred to herein as a casement support chamber 13. Accordingly, the present invention provides radio listening without the prior restrictions of carrying a receiver coupled by a connecting wire to earphones or an ear plug speaker. The present invention provides full stereophonic listening enjoyment, which is essentially unaffected by rigorous physical activity and recreation.

The radio device 10 is comprised of a casement 14 having inward 15 and outward 16 housings when viewed in relation to casement position at the ear 11. The outward compartment 15 contains an integrated circuit/chip comprised of a PC board 17 and radio circuitry 18. Also contained within the outward compartment 15 is a battery 19 which provides the power for operation of the radio. For purposes of description of the present invention, therefore, the outward housing primarily functions to contain radio circuitry and power source components, and to protect such components against adverse contact with the environment and natural elements.

In addition to the protective function of the outward casement, it also serves as structural support for function controls, such as on-off switch, radio frequency selection, and volume control. The sophistication of such function controls can extend from a simple on-off condition set by the position of the battery 19 within the outward casement and relative to circuit contacts 20 and 21, which are adapted to touch the positive and negative poles of the battery 19 when the battery is fully inserted within the large shell 22 of the outward compartment 15.

Circuit contact 20 is positioned on the rearward face of a compartment wall 27 which separates the radio circuitry 18 from the battery 19 within the outward compartment 15. The second contact 21 is positioned for proper physical contact with the grounding pole 25 of the battery 19. Contacts 20 and 21 are coupled to the circuitry 18 by leads 31 and 32. In this configuration, a preset frequency on the radio would render single-station reception at a predetermined volume.

A plastic spring 23 may be positioned between the circuitry contacts 20 and 21 and the battery poles 24 and 25 to maintain an open circuit condition until the battery is advanced into contact with the circuit contacts 20 and 21 by rotating a battery cap 26 clockwise and overcoming the bias of the spring 23. The spring may be unnecessary where the battery 19 fits snugly within a cavity portion 28 of the battery cap 26. This latter two-part structure enables ready access for insertion and/or replacement of the battery 19. The threaded configuration 29 of the battery cap 26 is one of numerous embodiments which incorporates a separable structure for the outward compartment 15.

It will be apparent to those skilled in the art that the outward compartment may be utilized to contain other specialized circuitry or components, as well as additional control functions. Examples of such additional structure are given further explanation hereafter, along with a description of the radio circuitry.

The inward compartment 16 of the casement 14 functions primarily to house a speaker means 30 which is directionally oriented toward the listener's ear. This speaker means may be an inexpensive standard ear plug speaker, or it may be a more sophisticated high fidelity speaker, such as illustrated as item 50 in FIG. 2. The speaker means 30 is coupled to the radio circuitry 18 by means of speaker leads 34.

In addition to housing the speaker means 30, the inward compartment 16 is positioned within the casement support chamber 13 and at the ear canal opening 9. By virtue of this position, the inward compartment carries most of the weight of the radio device 10 and must be adapted to fit snugly at the ear canal 9 or casement support chamber 13 so that the device is not dislodged with physical activity.

To ensure a tight fit and secure retention in this proper position, a foamed plastic insert 40 is positioned around the inward compartment 16. This foamed insert operates as a deformable retaining means which has an annular configuration to permit free transmission of the radio program along the annular axis 41. When inserted within the casement support chamber 13, the deformable plastic fills void spaces occurring between the support cartilage 12 and the housing of the inward compartment 16. Use of such foam plastic retaining means helps prevent dislodgement of the device upon jarring motion. Material selection for the plastic formed insert should be selected to maximize frictional resistance with the contacting skin surface at the ear.

Although the inward compartment 16 is shown with a threaded outer rim 42, other means for attachment of the inward compartment 16 to the outward compartment 15 will be apparent to those skilled in the art. It will obviously be necessary to electrically insulate the PC board 17 from the speaker means 30, as well as secure the PC board in a fixed position within the outward housing 15. This may be accomplished by gluing the PC board within the outward compartment 15 in a proper position and orientation.

With respect to general construction considerations, the casement 14 should be constructed of materials which are insulative and light in weight. Numerous plastics are available which satisfy these requirements. Likewise, the casement must be configured to fit properly at the ear in the casement support chamber 12. Most importantly, the size and weight of the outward compartment 15 and its contents must be minimized since the outward compartment extends beyond the support of the cartilage 12 of the ear. Generally, the diameter of any part of the casement should not exceed ¾ of an inch, and its length from the distal ends of the inward and outward compartments should be less than one inch.

The specific geometric configuration illustrated in FIG. 1 conforms to these requirements. This geometric configuration includes a cylindrical shape forming the outward housing 15 which converges to a cylindrical shape of smaller radial lengths to form the inward housing 16. The cylindrical shape of the inward housing 16 is configured to fit within the opening size of the ear canal 9.

Figure 2:
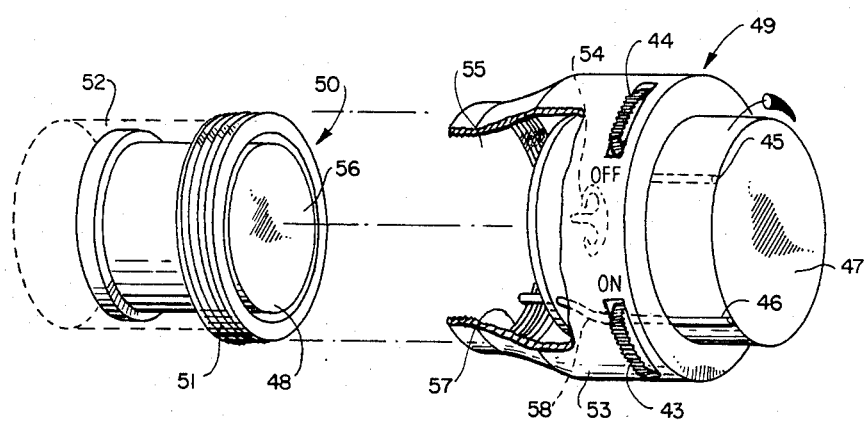
FIG. 2 is an open, perspective view of an additional embodiment of the subject invention.

FIG. 2 shows a second embodiment of the subject invention wherein the inward compartment 51 supports a plastic foamed retaining means 52, but does not have the smaller cylindrical segment 53 which fits within the ear canal. Instead, a high fidelity speaker means 50 is utilized, such as that which is available for stereophonic listening. In this case, the foamed plastic insert 52 supports the weight of the radio device (shown generally as 49 within the casement support chamber 13). Actual contact at the ear canal 9 is unnecessary.

The radio circuitry encased within the outward compartment 15 includes an antenna or other signal receiving means and an rf resonant circuit for selecting a desired transmission frequency. Item 35 in FIG. 1 represents an inductor which includes a core (such as a cylindrical ferrite core) axially oriented toward the ear canal 13 and which is operable as an antenna. Numerous other methods exist within the state of the art for receiving radio transmissions and need not be discussed in great detail herein.

Figure 3:
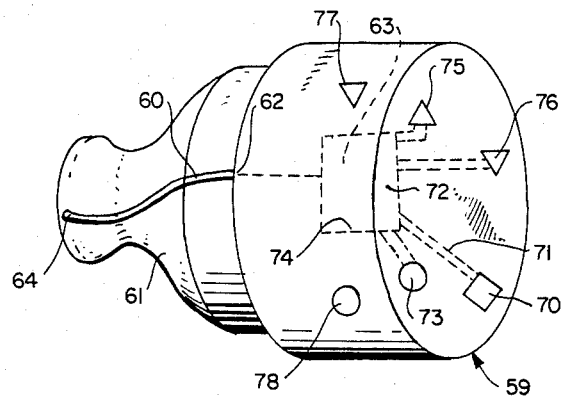
FIG. 3 illustrates a still further embodiment of the present ear radio, showing an antenna contact in accordance with the teachings of the present invention.

FIG. 3, however, illustrates a third embodiment of the subject invention which utilizes an exterior, exposed conductive contact 60 which is positioned on the inward compartment 61 and is adapted for contact with the skin of the user at the ear canal. The contact is connected at one end 62 to a PC board 63 with integrated circuitry including an rf resonant circuit. The purpose of this configuration is to maximize antenna reception by utilizing the person wearing the device as an antenna means. Contact between the exposed contact 60 and the user occurs when the radio device is inserted into the ear canal, with a lead portion 64 of the exposed contact 60 brought into direct contact with the user's skin. Further specification of detailed circuitry to implement the antenna improvements represented in FIG. 3 is deemed unnecessary, based on technology known to one of reasonable skill in the art.

Numerous types of rf resonant circuits can likewise be adapted for application within the subject ear radio device. Such resonant circuits can be adapted for reception of virtually any frequency band, and certainly would include AM and FM band widths. In addition, IR, VHF and UHF frequency bands will be of interest in view of specific applications of the subject invention as discussed hereafter. The rf circuit may be designed for single frequency reception, or may be adapted for variable tuning for multiple-station reception. Where single-station reception is desired, a crystal oscillator is effective, and is well-known within the state of the art. Where multiple-station tuning is desired, a standard LC oscillator can be incorporated within the radio circuitry 18 of the subject device. Here again, further detailed discussion of types and installation techniques for rf resonant circuits is deemed unnecessary, in view of the well-developed state of the art in this field.

Figure 5:
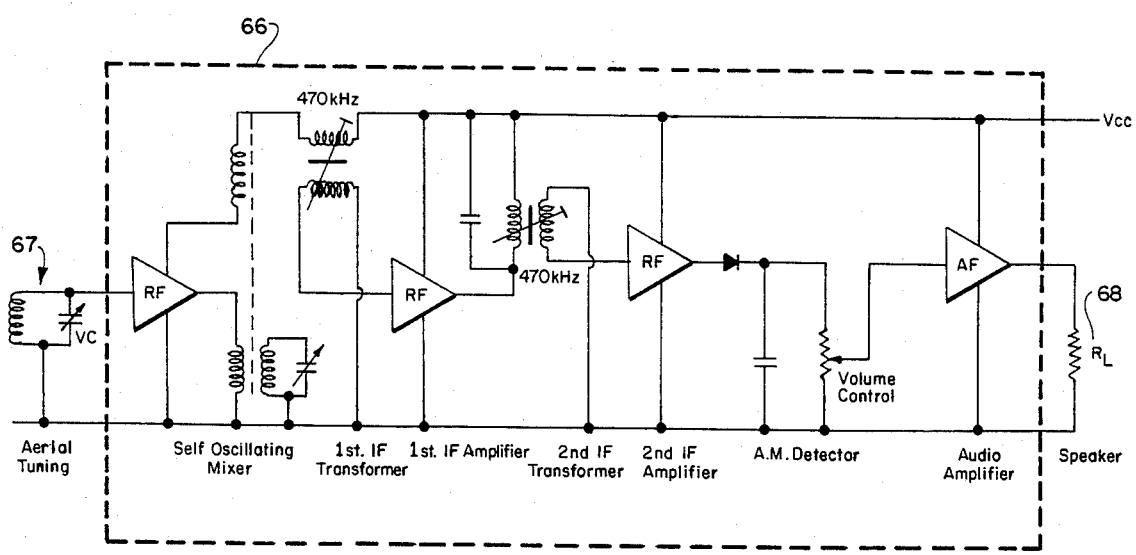
FIG. 5 is a block, schematic diagram illustrating circuit format for the subject radio device.

Finally, the radio circuitry 18 envisioned for the present device includes conventional amplifying the filtering circuitry for producing a clear radio signal, to be sent to the speaker means 30. Although detailed discussion of amplification and filtering circuitry is considered unnecessary in view of the advanced state of the art in this technology, a representative block schematic diagram has been set forth as FIG. 5. This circuit represents a basic superheterodyne with demodulating circuitry receiver, which can be embodied in a single PC board and integrated circuit chip. The portion of the circuitry embodied in a single integrated chip is enclosed within the dashed lines 66 set forth in the drawings. The LC tuning coil 67 and speaker means 68 shown outside the dashed lines have already been discussed. A circuit representative of the integrated chip suggested herein is ZN414, available from Ferranti Semiconductors of England.

FIG. 2 discloses an embodiment in which the speaker means 50 is directly coupled with the audio output of the amplification circuitry (enclosed within the outward compartment 53) by means of a spring-biased tab 54 which is attached centrally in an outward compartment wall 55. The supporting wall 55 is spatially positioned such that the contacting tab 54 is positioned against a first contact 56 of the speaker means 50. This is accomplished by rotating the inward compartment 51 in threaded engagement with the threads 57 of the outward casement 53. The closing contact with the speaker means 50 is accomplished by means of a common ground 58 which makes contact with the grounding pole 48 of the speaker means.

Other similar contacting configurations between the speaker means and radio circuitry will be apparent to those skilled in the art. The configuration illustrated in FIG. 2 represents one embodiment of the general method in which at least one spring-biased lead 54, having a fixed position with respect to the casement 49, is used to establish contact between the amplification circuitry and the speaker means. The fall circuit is closed by at least one additional contact 58, also having a fixed position with respect to the casement 49, the spring-biased lead 54 and additional contact 58 being separately and directly coupled to the circuitry and speaker means, and being properly oriented for direct contact to close the circuit between the circuitry and speaker means when the casement is in a closed, operational configuration, as when the inward 51 and outward 53 compartments are properly joined.

FIG. 2 also illustrates positioning of control circuitry for on-off function, frequency selection, and volume control. As illustrated, the embodiment of FIG. 2 utilizes a rotatable battery cap 47 which can be adjusted between an on position 46 and an off position 45. This is accomplished by use of the common ground 58, restricting its closed circuit operation to a single position 46 which makes closing contact with an enclosed battery (not shown).

Volume control is incorporated into the radio device by use of a rotary selector 44 which may be coupled to a variable resistor or other circuitry means for adjusting volume of the audio output signal. Likewise, frequency selection may be accomplished utilizing a similar rotary selector 43 which may be coupled to a variable LC oscillator within the radio circuitry.

Functional controls for on/off, frequency selection, and volume control are illustrated in FIG. 3 in a more preferred embodiment. In this embodiment, these functional controls are accomplished with the use of touch-activated circuitry developed within the current state of the art utilizing programmable unijunction transistors or comparable variable capacitance circuitry to utilize electrical characteristics of the human body to control radio operation. The operation of touch-activated circuitry is well-developed within the state of the art and requires no additional explanation herein.

FIG. 3 illustrates four touch-activated circuits to implement full functional control of the subject invention. By touching item 70, the device switches between respective on and off conditions which activate or disable the circuitry. This on/off switch 70 is coupled by leads 71 to the touch control circuitry 72 which may be contained on a separate chip, or may be carried on the main PC board containing other radio circuitry previously described. Frequency selection is accomplished by touching the round control device 73 which is coupled to the touch control circuitry by leads 74. As the user touches the frequency selector switch 73, the radio device sweeps a preselected band of radio frequencies, stopping at each frequency having an incoming signal from the antenna 60. This frequency sweeping operation continues as long as the user maintains finger contact at the selector switch 73.

Volume control is accomplished with a pair of touch-activated circuits 75 and 76. These are likewise coupled to the touch control circuitry and operate to raise or lower the volume, depending upon which switch is contacted by the user's finger. In the illustration of FIG. 3, the upwardly oriented triangle 75 provides increased volume, whereas the downwardly oriented triangle 76 provides lower volume. Each of the respective function control switches or tabs 70, 73, 75 and 76 operate in response to finger contact of the user. The variable geometric shapes permit the user to identify respective functions. These same shapes can be fixed on the sides of the device as shown at items 77 and 78 to permit identification of the specific selector tabs without activating the touch circuitry. Such identifier tabs 77 and 78 could be molded as raised shapes on the exterior surface of the casement 59. It will be apparent to those skilled in the art that other methods of tab identification and touch control circuitry can be adapted to develop convenience of operation of the subject radio device, particularly in view of being unable to see selector operation.

The present invention is well-adapted for many applications, wherever communication is important. For example, in addition to serving as a convenient radio device for recreational use and pleasure, the present device can also be applied in occupational fields, such as military communications, communications within law enforcement organizations, and virtually any circumstance where unidirectional communications would be helpful from a central transmitter to a number of users having reception stations.

In recreational or entertainment applications, a single device may be used for normal radio reception, or a pair of ear radio devices may be used for stereo reception. In the latter case, each radio device would have its rf resonant circuit adapted to receive one of the respective frequencies constituting a stereo transmission. Such devices could be color-coded or otherwise marked for left and right identification to conform to the left and right sides of the stereo broadcast. These devices would then be able to pick up general radio transmissions from commercial radio stations in a conventional manner.

The subject invention is also well-adapted for use with a separate rf transmitter which may be carried by the user as part of a radio receiver/cassette recorder. Such devices are commonly carried on a belt or in a pocket and provide a broad range of entertainment, including AM and FM radio, as well as other frequencies and cassette playback. The output signal from any of these functions can be transmitted through a small FM transmitter or comparable circuit for reception at the ear radio device which may have its rf resonant circuit preset to receive that specific transmission. Where the selected frequency is adapted as a carrier frequency, the ear radio device would include filter circuitry for removing the carrier frequency and retaining the program signal for transmission to the user. Stereo transmissions can be implemented in a similar manner by using two carrier frequencies for the respective right and left sides of the stereo transmission.

Figure 4:
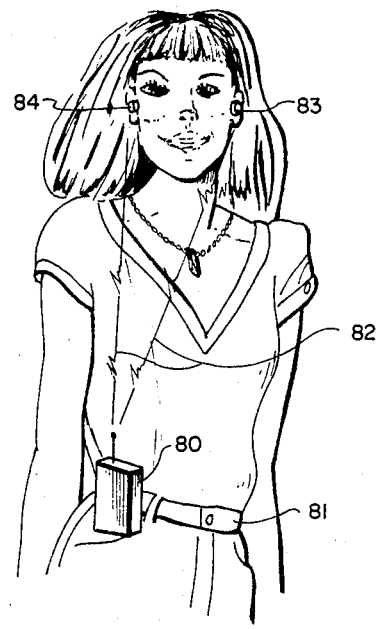
FIG. 4 shows one of several applications of the present invention for stereo use.

The above applications are illustrated in FIG. 4 wherein the transmitter device 80 is shown coupled to the user at his belt 81. This transmitter 80 generates an fm radio signal 82 which is received at the respective ear radio devices 83 and 84. This arrangement of radio reception can be further enlarged to other users having comparable ear radio devices tuned to pick up the transmission from the same transmitter 80. This arrangement is particularly well-suited for group activities in hiking, bicycle riding, etc. In essence, a single transmitter can provide entertainment listening to a substantial number of individuals.

In occupational applications, the subject device is a convenient and effective communication reception channel for any worker needing to have continuing communications with a central station. For example, military, police and security personnel could receive constant directions and communications from a military supervisor, team captain, or central information source, without having to carry expensive communication systems, as are currently being used within those fields of occupation. A specific example illustrates the functional application of this device and its improved convenience over prior art devices. For example, a military platoon of 12 to 16 men can be constantly directed by a platoon leader from a single radio transmitter. Each platoon member would wear a radio device in his ear and receive constant communication regarding activities, instructions and encouragement. It will be apparent to those skilled in the art that many applications of unidirectional communication are extremely well-suited for this communication system.

It is to be understood that the disclosure set forth herein is not to be construed as limiting the scope of the attached claims, which specifically define the invention. Numerous variations of circuitry and application are envisioned which have not been discussed herein in view of time and space limitations.

I claim:

1. A self-contained, fully operational radio receiving device adapted in size and configuration for implacement and retention at the entrance to an ear canal, said device being self-supported by surrounding ear cartilage which defines a casement support chamber, said device further comprising:

a casement having an outward and an inward housing as viewed in relation to casement position at the ear canal;

radio circuitry contained within the outward housing and positioned on an integrated circuit chip, said circuitry including (i) signal receiving means comprising a cylindrical antenna core positioned for axial orientation toward the ear canal for receiving radio transmissions, (ii) demodulating circuitry including an rf resonant circuit for selecting a desired transmission frequency and (iii) amplifying and filtering circuitry for producing a clear radio signal;

a power source coupled to the circuitry for powering circuit operation; and speaker means contained within the inward housing of the casement and coupled directly to the amplification circuitry for receiving and converting said audio signals to audible sound, said speaker means being structured for directional orientation toward the ear canal;

said casement having maximum outside width dimensions smaller than the greatest distance across the casement support chamber at the ear canal entrance and no greater than approximately ¾ inch, said casement having a length from distal sides of the inward to outward housing of less than approximately one inch.

2. A device as defined in claim 1, wherein the rf resonant circuit comprises a crystal oscillator set at a preselected frequency for single-station reception.

3. A device as defined in claim 1, wherein the rf resonant circuit comprises an LC oscillator which can be tuned for multiple-station reception.

4. A device as defined in claim 1, wherein the size and geometric configuration of the casement include a cylindrical shape forming the outward housing which converges to a cylindrical shape of smaller radial lengths to form the inward housing, the cylindrical shape of the inward housing being configured to conform to the opening size of the ear canal.

5. A device as defined in claim 1, further comprising an annular, deformable retaining means attached at the casement around the inward housing, said retaining means being adapted to fill void spaces occurring between the support chamber at the ear canal and the inward housing, and retaining means being adapted to increase resistance of the casement against slipping from its secured position at the ear canal.

6. A device as defined in claim 1 further comprising means for directly coupling the speaker means with the amplification circuitry wherein said coupling means comprises at least one spring-biased lead having a fixed position with respect to the casement and at least one contact also having a fixed position with respect to the casement, said lead and contact being separately and directly coupled to the circuitry and speaker means, and being properly oriented for direct contact to close the circuit between the circuitry and speaker means when the casement is in a closed, operational configuration with a second contact and lead completing the closed circuit.

7. A device as defined in claim 6, wherein the casement is separable at its outer housing into at least two parts to permit access for replacement of a battery power source.

8. A device as defined in claim 3, wherein the LC tunable rf resonant circuit is coupled to and controlled by a touch-activated circuit contained within the outer housing, said touch circuit being coupled to a touch tab mounted at an extreme exterior location of the casement relative to the ear canal, said tab being responsive to finger contact for selection of a specific radio frequency.

9. A device as defined in claim 1, wherein the amplification circuitry includes a touch-activated control volume circuit which is coupled to and controlled by a touch circuit contained within the outer housing, said touch circuit being coupled to a two-position touch tab mounted at an extreme exterior location of the casement relative to the ear canal, said tab being responsive to finger contact for variable raising or lowering of volume.

10. A device as defined in claim 1, wherein the amplification circuitry includes a touch-activated control on-off circuit which is coupled to and controlled by a touch circuit contained within the outer housing, said touch circuit being coupled to a touch tab mounted at an extreme exterior location of the casement relative to the ear canal, said tab being responsive to finger contact for closing connecting circuitry between the circuitry and the power source.

11. A device as defined in claim 1, further comprising an rf transmitter including means to emit a program signal superimposed on a carrier frequency, said rf resonant circuit being preset to receive the carrier frequency and accompanying program signal, said radio device including filter circuitry for filtering out the carrier frequency to thereby retain the program signal for transmission.

12. A device as defined in claim 11, further comprising an additional radio device having a second preset rf circuit adapted to receive a second carrier frequency transmitted from the transmitting device, thereby enabling reception of stereo transmissions.

13. A radio device as defined in claim 1, further comprising an additional radio device adapted for implacement in the other ear of a user, the rf resonant circuits of the respective devices being adapted to receive respective frequencies of a stereo transmission.

14. A device as defined in claim 1, further comprising a primary transmitter station which forms part of a communication network for enabling unidirectional transmission of information to preselected users of the subject device.

15. A device as defined in claim 14 wherein the rf resonant circuitry is tuned to a frequency selected from the IR, VHF or UHF frequency band.

* * * * *